(12) United States Patent
Burns et al.

(10) Patent No.: US 11,603,611 B2
(45) Date of Patent: Mar. 14, 2023

(54) COMPOSITE AND METHODS OF MAKING SAME

(71) Applicant: Columbia Insurance Company, Omaha, NE (US)

(72) Inventors: James T. Burns, Rocky Face, GA (US); Thomas Odum, Tunnel Hill, GA (US); Derek S. Bass, Cartersville, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 17/534,994

(22) Filed: Nov. 24, 2021

(65) Prior Publication Data

US 2022/0161519 A1    May 26, 2022

Related U.S. Application Data

(60) Provisional application No. 63/117,824, filed on Nov. 24, 2020.

(51) Int. Cl.
*B32B 7/09* (2019.01)
*B32B 7/10* (2006.01)
(Continued)

(52) U.S. Cl.
CPC ............. *D04H 1/498* (2013.01); *B32B 5/266* (2021.05); *B32B 7/09* (2019.01); *B32B 7/10* (2013.01);
(Continued)

(58) Field of Classification Search
CPC .. B32B 7/09; B32B 5/266; B32B 7/10; B32B 2307/308; D04H 1/498; D04H 1/485;
(Continued)

(56) References Cited

U.S. PATENT DOCUMENTS

| | | | |
|---|---|---|---|
| 2,013,620 A | 9/1935 | Ashby | |
| 5,891,547 A * | 4/1999 | Lawless | A44B 18/0011 428/92 |

(Continued)

FOREIGN PATENT DOCUMENTS

WO    WO 2020/202075 A1    10/2020

OTHER PUBLICATIONS

[NPL-1] "Polyethylene"; Wikipedia (Jul. 13, 2022); <https://en.wikipedia.org/wiki/Polyethylene>. (Year: 2022).*

(Continued)

*Primary Examiner* — Frank J Vineis
*Assistant Examiner* — Donald M Flores, Jr.
(74) *Attorney, Agent, or Firm* — Ballard Spahr LLP

(57) ABSTRACT

Described is a composite made from a woven fabric, a non-woven fabric, or a knitted face fabric and a non-woven fabric. The woven fabric, the non-woven fabric, or the knitted face fabric is needle punched such that fibers protrude into the non-woven fabric. The woven fabric, the non-woven fabric, or the knitted face fabric has a first polymer having a first melting point and a second polymer having a second melting point being higher than the first melting point. The nonwoven backing material comprises a third polymer having a third melting point and a fourth polymer having a fourth melting point being higher than the third melting point. The woven fabric, the non-woven fabric, or the knitted face fabric is further bonded to the nonwoven backing material applying heat to at least partially melt or soften the first polymer and the third polymer such that they bond together.

16 Claims, 5 Drawing Sheets

(51) Int. Cl.
*B32B 5/26* (2006.01)
*D04H 18/02* (2012.01)
*D04H 1/498* (2012.01)
*D04H 1/485* (2012.01)
*D04H 1/542* (2012.01)

(52) U.S. Cl.
CPC ............ *D04H 1/485* (2013.01); *D04H 1/542* (2013.01); *D04H 18/02* (2013.01); *B32B 2250/02* (2013.01); *B32B 2250/20* (2013.01); *B32B 2262/00* (2013.01); *B32B 2307/308* (2013.01); *B32B 2471/00* (2013.01)

(58) Field of Classification Search
CPC ...... D04H 1/5418; D04H 1/542; D04H 1/544; D04H 1/545; D04H 1/546; D04H 1/548; D04H 1/549; D04H 1/55; D04H 1/551
See application file for complete search history.

(56) References Cited

U.S. PATENT DOCUMENTS

| | | | |
|---|---|---|---|
| 6,162,748 | A | 12/2000 | Schilling et al. |
| 6,207,599 | B1* | 3/2001 | Coolen ............... D06N 7/0068 |
| | | | 428/95 |
| 7,135,214 | B1 | 11/2006 | Smith et al. |
| 9,212,437 | B2* | 12/2015 | Berger ................. B29C 70/081 |
| 9,243,359 | B2 | 1/2016 | Zafiroglu |
| 2008/0241459 | A1 | 10/2008 | Higgins et al. |
| 2009/0233508 | A1 | 9/2009 | Masanori |
| 2018/0355553 | A1 | 12/2018 | Coon |
| 2020/0331246 | A1 | 10/2020 | Ingram et al. |

OTHER PUBLICATIONS

[NPL-2] "Polyamide 6"; AZO materials (Oct. 9, 2011); <https://www.azom.com/article.aspx?ArticleID=442>. (Year: 2011).*
[NPL-3] "Polyamide 46"; Wikipedia (Jul. 13, 2022); <https://en.wikipedia.org/wiki/Nylon_46>. (Year: 2022).*
International Search Report and Written Opinion dated Feb. 23, 2022 by the International Searching Authority for International Application No. PCT/US21/60748 filed on Nov. 24, 2021 (Applicant-Shaw Industries Group, Inc.) (10 pages).

* cited by examiner

COMPOSITE AND METHODS OF MAKING SAME

CROSS-REFERENCE TO RELATED APPLICATIONS

This application claims the benefit of U.S. Provisional Application No. 63/117,824 filed Nov. 24, 2020, which is incorporated herein by reference in its entirety.

BACKGROUND

Commercially available composites can be used for floorcovering or wallcovering. The composites a conventionally formed by laminating a woven, non-woven, or knitted face fabric to a nonwoven backing using an adhesive layer. However, delamination is a common failure mode for these products.

Thus, there is still a need, however, to obtain composite without delamination issues, and without an adhesive layer. Still further, there is a need for methods that are capable of manufacturing such a composite. The composite and method disclosed herein provides a solution for these needs.

SUMMARY

The present invention is directed to a composite. The composite comprises a woven fabric, a non-woven fabric, or a knitted face fabric having a first surface and an opposing second surface. The woven fabric, the non-woven fabric, or the knitted face fabric is needle punched such that fibers protrude from the first surface the woven fabric, the non-woven fabric, or the knitted face fabric. The woven fabric, the non-woven fabric, or the knitted face fabric also comprises a first polymer having a first melting point and a second polymer having a second melting point being higher than the first melting point. The composite also comprises a nonwoven backing material having a first surface and an opposing second surface, wherein the nonwoven backing material comprises a third polymer having a third melting point and a fourth polymer having a fourth melting point being higher than the third melting point. The fibers protruding from the first surface the woven fabric, the non-woven fabric, or the knitted face fabric are interlocked with the first surface of the nonwoven backing material. Furthermore, the woven fabric, the non-woven fabric, or the knitted face fabric is further bonded to the nonwoven backing material by applying heat to at least partially melt or soften the first polymer and the third polymer such that they bond together.

Also disclosed is a method of making a composite, such as a composite disclosed herein. The method comprises providing a woven fabric, a non-woven fabric, or a knitted face fabric having a first surface and an opposing second surface, wherein the first surface of the woven fabric, the non-woven fabric, or the knitted face fabric contacts a first surface of a non-woven backing material. The woven fabric, the non-woven fabric, or the knitted face fabric is needle punched such that fibers protrude from the first surface the woven fabric, the non-woven fabric, or the knitted face fabric into the non-woven backing material. The woven fabric, the non-woven fabric, or the knitted face fabric also comprises a first polymer having a first melting point and a second polymer having a second melting point being higher than the first melting point. The method further comprises forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point. The method also comprises applying heat thereby at least partially melting or softening the first polymer and the third polymer such that they bond together. The step of forming the compressed material and the step of applying heat together forms the composite material.

Additional aspects of the disclosure will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

Figure 1:
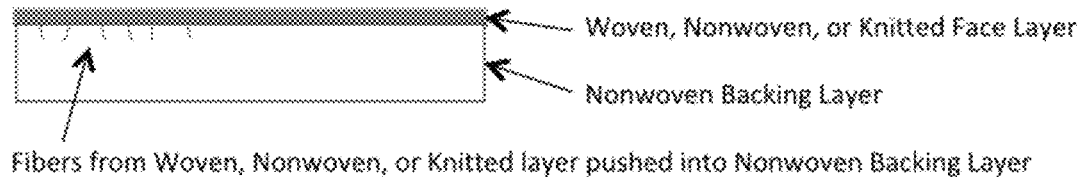
FIG. 1. shows a schematic of a non-limiting example of a composite disclosed herein where a woven, non-woven or knitted fabric is first attached to a non-woven backing fabric by a needlepunch process, which mechanically interlocks the fibers from the nonwoven or knitted fabric with those of the nonwoven backing fabric.

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

As used herein, the singular forms "a," "an" and "the" include plural referents unless the context clearly dictates otherwise. Thus, for example, reference to a "fiber" includes aspects having two or more such fibers unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It should be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

The term "fiber" as used herein includes fibers of extreme or indefinite length (i.e. filaments) and fibers of short length (i.e., staple fibers). It is further understood that the fiber described herein can be construed as it comprises materials of both virgin and recycled origin. In certain aspects of this invention, the fiber comprises recycled materials, wherein the recycled materials include, but are not limited to post-consumer or post-industrial materials, or a combination thereof. In yet other aspects, the fiber used in this invention comprises virgin materials.

As used herein, the term "polyester" refers to a category of polymers that contain the ester functional group in their main chain. Polyesters disclosed herein include naturally occurring chemicals, such as in the cutin of plant cuticles, as well as synthetics produced through step-growth polymerization. An non-limiting example of polyesters includes any long-chain synthetic polymer composed of at least 85% by weight of an ester of a substituted aromatic dicarboxylic acid, including but not restricted to substituted terephthalic units, $p(-R-O-CO-C_6H_4-CO-O-)_x$ and parasubstituted hydroxy-benzoate units, $p(-R-O-CO-C_6H_4-O-)_x$. In certain examples, the polyesters comprise polyethylene terephthalate (PET) homopolymer and copolymers, polypropylene terephthalate (PPT) homopolymer and copolymers and polybutylene terephthalate (PBT) homopolymer and copolymers, and the like, including those that contain comonomers such as cyclohexanedimethanol, cyclohexanedicarboxylic acid, isophthalic acid, and the like.

The term "polyamide," as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. In some aspects, the plurality of polyamide fibers comprise one or more of nylon 6, nylon 66, nylon 10, nylon 612, nylon 12, nylon 11, or any combination thereof. In other aspects, the plurality of polyamide fibers comprises nylon 6 or nylon 66. In yet other aspect, the plurality of polyamide fibers is nylon 6. In a yet further aspect, the plurality of polyamide fibers is nylon 66.

As defined herein, the term "polyolefin" refers to any class of polymers produced from a simple olefin (also called an alkene with the general formula Calla) as a monomer. In some aspects, the polyolefins include, but are not limited to, polyethylene, polypropylene, both homopolymer and copolymers, poly(l-butene), poly(3-methyl-1-butene), poly(4-methyl-1-pentene) and the like, as well as combinations or mixtures of two or more of the foregoing.

As defined herein, the term "polyurethane" refers to any class of polymers composed of a chain of organic units joined by carbamate (urethane, $R_1-O-CO-NR_2-R_3$, wherein $R_1$, $R_2$, and $R_3$ are the same or different) links.

As defined herein, the term "polystyrene" refers to any class of synthetic polymers produced from a simple styrene as a monomer. It is understood that the term "polystyrene" includes both atactic and syndiotactic polystyrenes. In some specific aspects, described are also co-polystyrenes including a high-impact polystyrenes (HIPS), acrylonitrile butadiene styrene (ABS) or copolymer of styrene with acrylonitrile (SAN), or copolymer of styrene with maleic acid (SMA).

As defined herein, the term "acetal" refers to a functional group with the following connectivity of $R_2C(OR')_2$, wherein both R' groups can comprise hydrogen or organic fragments. The two R'O groups can be equivalent to each other (known as a symmetric acetal) or different (known as a mixed acetal).

As used herein, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to refer to an amount that is than about 1% by weight, e.g., less than about 0.5% by weight, less than about 0.1% by weight, less than about 0.05% by weight, or less than about 0.01% by weight of the stated material, based on the total weight of the composition.

As used herein, the term or phrase "effective," "effective amount," or "conditions effective to" refers to such amount or condition that is capable of performing the function or property for which an effective amount or condition is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

As used herein, and unless the context clearly indicates otherwise, the term "carpet" is used to generically include broadloom carpet, carpet tiles, area rugs, and artificial grass (or turf). To that end, the term "broadloom carpet" refers to a broadloom textile flooring product manufactured for and intended to be used in roll form. The term "carpet tile" refers to a modular floor covering, conventionally manufactured in 18"×18","24"×24" or 36"×36" squares, but other sizes and shapes are also within the scope of the present invention. Any of these exemplary carpets can be woven, non-woven, tufted, or needle-punched.

As used herein, the term "reclaimed fiber" includes a fiber reclaimed from a new product, post-industrial product, manufacturing remnants, quality control discarded or rejected material, or a post-consumer product. In some exemplary aspect, such products comprise carpets or carpet tiles.

As used herein, the term "post-consumer fiber" refers to a fiber that was a component part of a product previously in use by a consumer. The post-consumer fibers include fibers reclaimed from the products that have been used in residential, commercial, and industrial applications, and subsequently have been collected from the site of use or otherwise discarded.

As used herein, the term "post-industrial fiber" refers to a fiber reclaimed from a product that is a byproduct of the product manufacturing that has been diverted from the manufacturing waste stream.

As used herein, the term "acclimation period" refers to a period of time required for one or more components in the layered composite article to adjust or condition to equalize differing stresses that may be present in the various components. In some aspects, the lack of an "acclimation period" can refer to the lack of an acclimation period associated with assembly of the various component parts during manufacture of the layered composite article of the present disclosure. In other aspects, an acclimation period can refer to a period of time or lack thereof between product arrival at a site of installation and actual installation of the product.

Besides the locking means provided by the layered composite articles, the interlocking mechanism, as defined herein, can further include locking elements. In some examples, such locking elements can include strips with salient features that engage the locking element onto two adjacent articles. Such locking devices can be made of the same material as a layered composite article, aluminum, wood fiber, etc.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

Article

A composite disclosed herein can be produced by the use of needlepunching to mechanically interlock a face fabric to a nonwoven substrate. A thermal bonding step can then be used to selectively at least partially melt or soften a polymer in the face fabric and also a polymer in the nonwoven substrate such that they bond together. The disclosed composite can be produced by combining the needlepunching and the thermal bonding step with a compression process. The combination of these three processes greatly enhances the physical properties, such as the wear resistance and edge fraying, of the composite, as compared to conventional composites. The composite disclosed herein is suitable for secondary processes such as molding, texturing, and/or patterning to enhance the design of the composite.

Disclosed herein is a composite comprising:
a) a woven fabric, a non-woven fabric, or a knitted face fabric having a first surface and an opposing second surface, wherein:
  i) the woven fabric, the non-woven fabric, or the knitted face fabric is needle punched such that fibers protrude from the first surface the woven fabric, the non-woven fabric, or the knitted face fabric;
  ii) the woven fabric, the non-woven fabric, or the knitted face fabric comprises a first polymer having a first melting point and a second polymer having a second melting point being higher than the first melting point;
b) a nonwoven backing material having a first surface and an opposing second surface, wherein the nonwoven backing material comprises a third polymer having a third melting point and a fourth polymer having a fourth melting point being higher than the third melting point,
wherein the fibers protruding from the first surface of the woven fabric, the non-woven fabric, or the knitted face fabric are interlocked with the first surface of the nonwoven backing material, and
wherein the woven fabric, the non-woven fabric, or the knitted face fabric is further bonded to the nonwoven backing material by applying heat to at least partially melt or soften the first polymer and the third polymer such that they bond together.

In one aspect, the first polymer also bonds to the second polymer and the fourth polymer although the second polymer and the fourth polymer are not melted or softened in the process used to make the composite.

In one aspect, the third polymer also bonds to the second polymer and the fourth polymer although the second polymer and the fourth polymer are not melted or softened in the process used to make the composite.

In one aspect, the needlepunching produces structuring, wherein loops from the fibers are formed on the second surface of the woven fabric, the non-woven fabric, or the knitted face fabric.

In one aspect, the composite has a three dimensional shape. The three dimensional shape of the composite can be produced from the compression step described herein. The three dimensional shape of the composite can be produced from needle structuring. In one aspect, the three dimensional shape of the composite can be present by a three dimensional shape of the woven fabric, the non-woven fabric, or the knitted face fabric. In one aspect, the three dimensional shape of the composite can be present by a three dimensional shape of second surface of the woven fabric, the non-woven fabric, or the knitted face fabric.

In one aspect, the composite comprises a woven fabric having the first surface and the opposing second surface. For example, the woven fabric can be a woven jacquard fabric. In another aspect, wherein the composite comprises a non-woven fabric having the first surface and the opposing second surface. In yet another aspect, wherein the composite comprises a knitted face fabric having the first surface and the opposing second surface.

The first polymer, second polymer, third polymer, and fourth polymer are compatible with the processes used to produce the composite. The first polymer and third polymer have melting points that allows them to at least partially melt or soften in the thermal bonding step such that they bond together. The second polymer and fourth polymer have melting points higher than the heat applied in the thermal bonding step such that they do not melt of soften to the point where then bond together with each other or other polymers.

The first polymer is present in a fiber. The second polymer is present in a fiber. In one aspect, the first polymer is present in a fiber different from the fiber containing the second polymer. In another aspect, the first polymer and the second polymer are present in the same fiber. Such a fiber can be a in a multi-component fiber, such as a fiber having a sheath core configuration.

The third polymer is present in a fiber. The fourth polymer is present in a fiber. In one aspect, the third polymer is present in a fiber different from the fiber containing the fourth polymer. In another aspect, the third polymer and the fourth polymer are present in the same fiber. Such a fiber can be a in a multi-component fiber, such as a fiber having a sheath core configuration.

The fiber(s) of the first polymer and/or second polymer interlocks with the fiber(s) of the third polymer and/or fourth polymer. Thus, fibers protruding from the first surface the woven fabric, the non-woven fabric, or the knitted face fabric are fibers comprising the first polymer and/or second polymer and the first surface of the nonwoven backing material comprises fiber(s) of the third polymer and/or fourth polymer.

In certain aspects, the fibers disclosed herein can comprise a staple fiber, a bulk continuous fiber (BCF), or a combination thereof. In some aspects, the fiber comprising the first polymer and/or second polymer can comprise a staple fiber. In other aspects, the fiber comprising the first polymer and/or second polymer can comprise a bulk continuous fiber. In yet other aspects, fiber comprising the first polymer and/or second polymer can comprise both staple and bulk continuous fiber. In one aspect, the fibers disclosed herein can be crimped. In another aspect, the fibers disclosed herein can be non-crimped. In one aspect, the fibers disclosed herein can have from 1 to 50 denier per filament, for example, from 2 to 30 denier per filament, from 10 to 30 denier per filament or from 10 to 20 denier per filament. In one aspect, the fibers disclosed herein can have a length from 0.5 to 6 inches, for example, from 1 to 5 inches or from 2 to 4 inches.

In some aspects, the fiber comprising the third polymer and/or fourth polymer can comprise a staple fiber. In other aspects, the fiber comprising the third polymer and/or fourth polymer can comprise a bulk continuous fiber. In yet other aspects, fiber comprising the third polymer and/or fourth polymer can comprise both staple and bulk continuous fiber.

In one aspect, the first polymer is substantially identical to the third polymer. In another aspect, the first polymer has a melting point that is substantially identical to the melting point of the third polymer.

In one aspect, the first polymer is identical to the third polymer. In another aspect, the first polymer has a melting point that is identical to the melting point of the third polymer.

In one aspect, the second polymer is substantially identical to the fourth polymer. In another aspect, the second polymer has a melting point that is substantially identical to the melting point of the fourth polymer.

In one aspect, the second polymer is identical to the fourth polymer. In another aspect, the second polymer has a melting point that is identical to the melting point of the fourth polymer.

In one aspect, the first polymer comprises polyester, polypropylene, polyethylene, polyamides, polyurethane, polylactic acid, acetal, co-polyester, co-polyamide, polystyrene, modacrylic, or a combination thereof. For example, the first polymer can comprise polyester. In another example, the first polymer can comprise polypropylene. In yet another example, the first polymer can comprise polyethylene. In yet another example, the first polymer can comprise polyamide. In yet another example, the first polymer can comprise polyurethane. In yet another example, the first polymer can comprise polylactic acid. In yet another example, the first polymer can comprise acetal. In yet another example, the first polymer can comprise co-polyester. In yet another example, the first polymer can comprise modacrylic. In yet another example, the first polymer can comprise co-polyamide. In yet another example, the first polymer can comprise polystyrene.

In one aspect, the second polymer comprises polyester, polypropylene, polyethylene, polyamides, polyurethane, polylactic acid, acetal, co-polyester, co-polyamide, polystyrene, modacrylic, or a combination thereof. For example, the second polymer can comprise polyester. In another example, the second polymer can comprise polypropylene. In yet another example, the second polymer can comprise polyethylene. In yet another example, the second polymer can comprise polyamide. In yet another example, the second polymer can comprise polyurethane. In yet another example, the second polymer can comprise polylactic acid. In yet another example, the second polymer can comprise acetal. In yet another example, the second polymer can comprise co-polyester. In yet another example, the second polymer can comprise modacrylic. In yet another example, the second polymer can comprise co-polyamide. In yet another example, the second polymer can comprise polystyrene.

In one aspect, the third polymer comprises polyester, polypropylene, polyethylene, polyamides, polyurethane, polylactic acid, acetal, co-polyester, co-polyamide, polystyrene, modacrylic, or a combination thereof. For example, the third polymer can comprise polyester. In another example, the third polymer can comprise polypropylene. In yet another example, the third polymer can comprise polyethylene. In yet another example, the third polymer can comprise polyamide. In yet another example, the third polymer can comprise polyurethane. In yet another example, the third polymer can comprise polylactic acid. In yet another example, the third polymer can comprise acetal. In yet another example, the third polymer can comprise co-polyester. In yet another example, the third polymer can comprise modacrylic. In yet another example, the third polymer can comprise co-polyamide. In yet another example, the third polymer can comprise polystyrene.

In one aspect, the fourth polymer comprises polyester, polypropylene, polyethylene, polyamides, polyurethane, polylactic acid, acetal, co-polyester, co-polyamide, polystyrene, modacrylic, or a combination thereof. For example, the fourth polymer can comprise polyester. In another example, the fourth polymer can comprise polypropylene. In yet another example, the fourth polymer can comprise polyethylene. In yet another example, the fourth polymer can comprise polyamide. In yet another example, the fourth polymer can comprise polyurethane. In yet another example, the fourth polymer can comprise polylactic acid. In yet another example, the fourth polymer can comprise acetal. In yet another example, the fourth polymer can comprise co-polyester. In yet another example, the fourth polymer can comprise modacrylic. In yet another example, the fourth polymer can comprise co-polyamide. In yet another example, the fourth polymer can comprise polystyrene.

In one aspect, the first polymer, second polymer, third polymer, and fourth polymer each comprises polyester. For example, the first polymer, second polymer, third polymer, and fourth polymer can each consist of polyester. In one aspect, the composite comprises 100 wt % of polyester.

In one aspect, the melting point of the first polymer is from about 80° C. to about 250° C. For example, the melting point of the first polymer can be from about 95° C. to about 250° C. In yet another example, the melting point of the first polymer can be from about 110° C. to about 250° C. In yet another example, the melting point of the first polymer can be from about 95° C. to about 230° C. In yet another example, the melting point of the first polymer can be from about 95° C. to about 210° C. In yet another example, the melting point of the first polymer can be from about 95° C. to about 190° C. In yet another example, the melting point of the first polymer can be from about 95° C. to about 170° C. In yet another example, the melting point of the first polymer can be from about 110° C. to about 150° C. In yet another example, the melting point of the first polymer can be from about 130° C. to about 250° C. In yet another example, the melting point of the first polymer can be from about 150° C. to about 250° C. In yet another example, the melting point of the first polymer can be from about 170° C. to about 250° C. In yet another example, the melting point of the first polymer can be from about 190° C. to about 250° C. In yet another example, the melting point of the first polymer can be from about 210° C. to about 250° C. In yet another example, the melting point of the first polymer can be from about 130° C. to about 210° C. In yet another example, the melting point of the first polymer can be from about 95° C. to about 150° C. In yet another example, the melting point of the first polymer can be from about 95° C. to about 130° C. In yet another example, the melting point of the first polymer can be from about 110° C. to about 150° C.

In one aspect, the melting point of the second polymer is from about 130° C. to about 450° C. For example, the melting point of the second polymer can be from about 130° C. to about 300° C. In yet another example, the melting point of the second polymer can be from about 130° C. to about 275° C. In yet another example, the melting point of the second polymer can be from about 150° C. to about 275° C. In yet another example, the melting point of the second polymer can be from about 200° C. to about 300° C. In yet another example, the melting point of the second polymer can be from about 225° C. to about 275° C. In yet another example, the melting point of the second polymer can be from about 150° C. to about 450° C. In yet another example, the melting point of the second polymer can be from about 200° C. to about 450° C. In yet another example, the melting point of the second polymer can be from about 150° C. to about 250° C.

In one aspect, the melting point of the third polymer is from about 80° C. to about 250° C. For example, the melting point of the third polymer can be from about 95° C. to about 250° C. In yet another example, the melting point of the third polymer can be from about 110° C. to about 250° C. In yet another example, the melting point of the third polymer can be from about 95° C. to about 230° C. In yet another example, the melting point of the third polymer can be from about 95° C. to about 210° C. In yet another example, the melting point of the third polymer can be from about 95° C. to about 190° C. In yet another example, the melting point of the third polymer can be from about 95° C. to about 170° C. In yet another example, the melting point of the third polymer can be from about 110° C. to about 150° C. In yet another example, the melting point of the third polymer can be from about 130° C. to about 250° C. In yet another example, the melting point of the third polymer can be from about 150° C. to about 250° C. In yet another example, the melting point of the third polymer can be from about 170° C. to about 250° C. In yet another example, the melting point of the third polymer can be from about 190° C. to about 250° C. In yet another example, the melting point of the third polymer can be from about 210° C. to about 250° C. In yet another example, the melting point of the third polymer can be from about 130° C. to about 210° C. In yet another example, the melting point of the third polymer can be from about 95° C. to about 150° C. In yet another example, the melting point of the third polymer can be from about 95° C. to about 130° C. In yet another example, the melting point of the third polymer can be from about 110° C. to about 150° C.

In one aspect, the melting point of the fourth polymer is from about 130° C. to about 450° C. For example, the melting point of the fourth polymer can be from about 130° C. to about 300° C. In yet another example, the melting point of the fourth polymer can be from about 130° C. to about 275° C. In yet another example, the melting point of the fourth polymer can be from about 150° C. to about 275° C. In yet another example, the melting point of the fourth polymer can be from about 200° C. to about 300° C. In yet another example, the melting point of the fourth polymer can be from about 225° C. to about 275° C. In yet another example, the melting point of the fourth polymer can be from about 150° C. to about 450° C. In yet another example, the melting point of the fourth polymer can be from about 200° C. to about 450° C. In yet another example, the melting point of the fourth polymer can be from about 150° C. to about 250° C.

In one aspect, the melting point of the second polymer is at least 20° C. higher than the melting point of the first polymer. For example, the melting point of the second polymer is at least 40° C. higher than the melting point of the first polymer. In another example, melting point of the second polymer is at least 60° C. higher than the melting point of the first polymer. In another example, melting point of the second polymer is at least 80° C. higher than the melting point of the first polymer. In another example, melting point of the second polymer is at least 100° C.

higher than the melting point of the first polymer. In another example, melting point of the second polymer is at least 120° C. higher than the melting point of the first polymer. In another example, melting point of the second polymer is at least 140° C. higher than the melting point of the first polymer. In another example, melting point of the second polymer is at least 160° C. higher than the melting point of the first polymer. In another example, melting point of the second polymer is at least 180° C. higher than the melting point of the first polymer. In another example, melting point of the second polymer is from about 20° C. to about 250° C. higher than the melting point of the first polymer. In another example, melting point of the second polymer is from about 60° C. to about 250° C. higher than the melting point of the first polymer. In another example, melting point of the second polymer is from about 60° C. to about 200° C. higher than the melting point of the first polymer. In another example, melting point of the second polymer is from about 100° C. to about 200° C. higher than the melting point of the first polymer.

In one aspect, the melting point of the fourth polymer is at least 20° C. higher than the melting point of the third polymer. For example, the melting point of the fourth polymer is at least 40° C. higher than the melting point of the third polymer. In another example, melting point of the fourth polymer is at least 60° C. higher than the melting point of the third polymer. In another example, melting point of the fourth polymer is at least 80° C. higher than the melting point of the third polymer. In another example, melting point of the fourth polymer is at least 100° C. higher than the melting point of the third polymer. In another example, melting point of the fourth polymer is at least 120° C. higher than the melting point of the third polymer. In another example, melting point of the fourth polymer is at least 140° C. higher than the melting point of the third polymer. In another example, melting point of the fourth polymer is at least 160° C. higher than the melting point of the third polymer. In another example, melting point of the fourth polymer is at least 180° C. higher than the melting point of the third polymer. In another example, melting point of the fourth polymer is from about 20° C. to about 250° C. higher than the melting point of the third polymer. In another example, melting point of the fourth polymer is from about 60° C. to about 250° C. higher than the melting point of the third polymer. In another example, melting point of the fourth polymer is from about 60° C. to about 200° C. higher than the melting point of the third polymer. In another example, melting point of the fourth polymer is from about 100° C. to about 200° C. higher than the melting point of the third polymer.

In one aspect, the melting point of the each of the second polymer and the fourth polymer is at least 20° C. higher than the melting point of the each of the first polymer and the third polymer. For example, the melting point of the each of the second polymer and the fourth polymer is at least 40° C. higher than the melting point of the each of the first polymer and the third polymer. In another example, melting point of the each of the second polymer and the fourth polymer is at least 60° C. higher than the melting point of the each of the first polymer and the third polymer. In another example, melting point of the each of the second polymer and the fourth polymer is at least 80° C. higher than the melting point of the each of the first polymer and the third polymer. In another example, melting point of the each of the second polymer and the fourth polymer is at least 100° C. higher than the melting point of the each of the first polymer and the third polymer. In another example, melting point of the each of the second polymer and the fourth polymer is at least 120° C. higher than the melting point of the each of the first polymer and the third polymer. In another example, melting point of the each of the second polymer and the fourth polymer is at least 140° C. higher than the melting point of the each of the first polymer and the third polymer. In another example, melting point of the each of the second polymer and the fourth polymer is at least 160° C. higher than the melting point of the each of the first polymer and the third polymer. In another example, melting point of the each of the second polymer and the fourth polymer is at least 180° C. higher than the melting point of the each of the first polymer and the third polymer. In another example, melting point of the each of the second polymer and the fourth polymer is from about 20° C. to about 250° C. higher than the melting point of the each of the first polymer and the third polymer. In another example, melting point of the each of the second polymer and the fourth polymer is from about 60° C. to about 250° C. higher than the melting point of the each of the first polymer and the third polymer. In another example, melting point of the each of the second polymer and the fourth polymer is from about 60° C. to about 200° C. higher than the melting point of the each of the first polymer and the third polymer. In another example, melting point of the each of the second polymer and the fourth polymer is from about 100° C. to about 200° C. higher than the melting point of the each of the first polymer and the third polymer.

In yet other aspects, where the fibers disclosed herein can comprise a multi-component fiber. For example, the fibers comprising the first polymer and/or second polymer can be a multi-component fiber. In another example, the fibers comprising the third polymer and/or fourth polymer can be a multi-component fiber. It is understood that in some aspects of the present invention, the multi-component fibers can be defined as "extruding two polymers from the same spinneret with both polymers contained within the same filament." In some aspects, multi-component fibers can have any cross sectional shape or geometry that can be contemplated by one of ordinary skill in the art. In some aspects, the multi-component fibers can have cross-section structures that include but are not limited to side-by-side fiber, sheath-core fiber, islands-in-the-sea fiber and segmented-pie cross-section types.

In yet other exemplary aspects, the multi-component fibers comprise a sheath-core configuration. In some aspects, when the sheath-core configuration comprises the first polymer and the second polymer, the sheath comprises the first polymer and the core comprises the second polymer. In some aspects, when the sheath-core configuration comprises the third polymer and the fourth polymer, the sheath comprises the third polymer and the core comprises the fourth polymer.

It is further understood that in some aspects the sheath and core of the multi-component fiber can comprise the same type of polymer having different melting points. For example, both the first polymer and the second polymer can both be a polyester but with different melting points. In another example, both the third polymer and the fourth polymer can both be a polyester but with different melting points.

In still further aspects, the sheath-core multi-component fiber comprises a polyester as a core component and polyethylene as a sheath component. In still further aspects, the sheath-core multi-component fiber comprises a polyester having the first melting point as a core component and a polyester having the second melting point as a sheath component.

In some aspects, the first polymer can be present in the woven fabric, a non-woven fabric, or a knitted face fabric from greater than 0% to less than 100% by weight, including exemplary amounts of 5%, 10%, 15%, 20%, 25%, 30%, 35%, 40%, 45%, 50%, 55%, 60%, 65%, 70%, 75%, 80%, 85%, 90%, 95%, and 99% by weight of the woven fabric, the non-woven fabric, or the knitted face fabric. In still further aspects, the first polymer can be present in the woven fabric, a non-woven fabric, or a knitted face fabric from can be present in an amount within any range derived from the above values, including for example, an amount in the range from about 0% to about 80% by weight, alternatively from about 5% to about 60% by weight, alternatively from about 5% to about 50% by weight, or still alternatively from about 10% to about 40% by weight of the woven fabric, a non-woven fabric, or a knitted face fabric.

In some aspects, the second polymer can be present in the woven fabric, a non-woven fabric, or a knitted face fabric from greater than 0% to less than 100% by weight, including exemplary amounts of 5%, 10%, 15%, 20%, 25%, 30%, 35%, 40%, 45%, 50%, 55%, 60%, 65%, 70%, 75%, 80%, 85%, 90%, 95%, and 99% by weight of the woven fabric, the non-woven fabric, or the knitted face fabric. In still further aspects, the second polymer can be present in the woven fabric, a non-woven fabric, or a knitted face fabric from can be present in an amount within any range derived from the above values, including for example, an amount in the range from about 0% to about 80% by weight, alternatively from about 50% to about 90% by weight, alternatively from about 60% to about 90% by weight of the woven fabric, a non-woven fabric, or a knitted face fabric.

In some aspects, the third polymer can be present in the nonwoven backing material from greater than 0% to less than 100% by weight, including exemplary amounts of 5%, 10%, 15%, 20%, 25%, 30%, 35%, 40%, 45%, 50%, 55%, 60%, 65%, 70%, 75%, 80%, 85%, 90%, 95%, and 99% by weight of the nonwoven backing material. In still further aspects, the third polymer can be present in the nonwoven backing material from can be present in an amount within any range derived from the above values, including for example, an amount in the range from about 0% to about 80% by weight, alternatively from about 20% to about 60% by weight, alternatively from about 5% to about 50% by weight, or still alternatively from about 10% to about 40% by weight of the woven fabric, a non-woven fabric, or a knitted face fabric.

In some aspects, the fourth polymer can be present in the nonwoven backing material from greater than 0% to less than 100% by weight, including exemplary amounts of 5%, 10%, 15%, 20%, 25%, 30%, 35%, 40%, 45%, 50%, 55%, 60%, 65%, 70%, 75%, 80%, 85%, 90%, 95%, and 99% by weight of the nonwoven backing material. In still further aspects, the fourth polymer can be present in the nonwoven backing material from can be present in an amount within any range derived from the above values, including for example, an amount in the range from about 0% to about 80% by weight, alternatively from about 40% to about 80% by weight, alternatively from about 60% to about 90% by weight of the woven fabric, a non-woven fabric, or a knitted face fabric.

In still further aspects, the composite is substantially free of a PVC material, or high density fiber (HDF) derived from a wood based material, or medium density fiber (MDF) derived from a wood based material. In still further aspects, the composite is substantially free of a wood based material.

In yet other aspects, the composite can further comprise a filler component. Exemplary and non-limiting fillers that can be incorporated into either layer of the composite can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In some aspects, the filler content can be virgin. In other aspects, the filler content can be reclaimed. In certain aspects, the filler content can be reclaimed from post-consumer articles. In yet other aspects, the filler content can be reclaimed from post-industrial articles.

In certain aspects, the filler comprises one or more of calcium carbonate, aluminum trihydrate, barite, feldspar, cullet, fly ash, kaolin clay, limestone, polyurethane foam, rubber, thermoplastic powder, thermoplastic polyurethane (TPU), wollastonite, or any combination thereof.

In yet other aspects, the composite can further comprise a pigment, a flame retardant, surfactant, processing aids, or a combination thereof. In certain aspects, the composite can comprise one or more flame retardant components. Exemplary flame retardants that can be incorporated into the rigid core include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resorcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the composite and the selection of such amount will depend on a required application. Such amounts can be readily determined through no more than routine experimentation.

In other aspects, any pigments or surfactant known in the art can be utilized. In yet other aspects, any processing aids known in the art can be used. In some aspects, processing aids can include without limitation antistatic chemicals, lubricants, oils, or any combination thereof.

In yet other aspects, at least one of the fibers disclosed herein can comprise reclaimed fibers. In some aspects, the reclaimed fibers can comprise a post-consumer fiber. In still further aspects, the reclaimed fibers can comprise a post-industrial fiber. In still further aspects, the reclaimed fibers can comprise both a post-consumer and post-industrial fiber. It is understood that the both post-consumer and post-industrial fibers can comprise any fibers described above. It is understood that in some aspects, the reclaimed fiber is reclaimed from a carpet or carpet tile. In yet other aspects, the reclaimed fiber can be fiber reclaimed from any material, for example any material comprising polymeric and/or natural fibers.

It is understood that by incorporating reclaimed material into the disclosed composite several advantages can be realized. For example, second generation products incorporating the reclaimed material have less of an environmental footprint relative to traditional composites, comprising only virgin materials. In a further aspect, the use of reclaimed material reduces the amount of traditional, often environmentally harmful materials that previously were sent to landfill, while still providing the same or similar level of composite performance. Still further, substitution of virgin material with reclaimed material can reduce the manufacturing costs associated with producing various composite products, such as floor covering products. Additionally, the incorporation of reclaimed material into a second generation composite can also provide mechanical reinforcement or stability to the second generation composite, if desired.

In some aspects, the composite has a density in the range of from about 5 lb/ft$^3$ to about 100 lb/ft$^3$, including exemplary densities of 10, 15, 20, 25, 30, 35, 40, 45, 50, 55, 60, 65, 70, 75, 80, 85, 90, and 95 lb/ft$^3$. In still further aspects, the volumetric density can be a value within any range derived from the above values, including for example, a density of from about 15 to about 75 lb/ft$^3$, from about 25 to about 100 lb/ft$^3$, from about 35 to about 100 lb/ft$^3$ from about 40 to about 100 lb/ft$^3$, from about 45 to about 100 lb/ft$^3$, from about 50 to about 100 lb/ft$^3$, from about 55 to about 100 lb/ft$^3$, from about 60 to about 100 lb/ft$^3$.

In certain aspects, the composite can have a density of at least about 10 lb/ft$^3$, including exemplary values of at least about 15 lb/ft$^3$, about 20 lb/ft$^3$, about 25 lb/ft$^3$, about 30 lb/ft$^3$, about 35 lb/ft$^3$, about 40 lb/ft$^3$, about 45 lb/ft$^3$, about 50 lb/ft$^3$, about 55 lb/ft$^3$, about 60 lb/ft$^3$, about 65 lb/ft$^3$, about 70 lb/ft$^3$, or about 75 lb/ft$^3$. In certain aspects, the composite can have a density in a range between any two foregoing values.

In yet other aspects, the composite can have a density less than about 50 lb/ft$^3$, about 45 lb/ft$^3$, about 40 lb/ft$^3$, about 35 lb/ft$^3$, about 30 lb/ft$^3$, 25 lb/ft$^3$, about 20 lb/ft$^3$, about 15 lb/ft$^3$, or about 10 lb/ft$^3$. In certain aspects, the composite can have a density in a range between any two foregoing values.

In certain aspects, the composite has a thickness in the range from about 1 mm to about 12 mm, including exemplary values of about 2 mm, about 3 mm, about 4 mm, about 5 mm, about 6 mm, about 7 mm, about 8 mm, about 9 mm, about 10 mm, and about 11 mm. In still further aspects, the composite can have a thickness in any range between two foregoing values. In some aspects, the thickness can be in the range from about 1.5 mm to about 12 mm, from about 2 mm to about 12 mm, or from about 5 mm to about 12 mm.

It is further understood that in some aspects, the disclosed composite can be permeable to moisture. In yet other aspects, the composite is impermeable to moisture. In still further aspects, the composite does not accumulate or hold moisture within the composite.

The strength of the disclosed composite can be determined by the VELCRO® test. The VELCRO® test utilizes a VELCRO® tester to measure the composite strength. VELCRO is a registered trademark for the well-known hook and loop fastening material. In the VELCRO® test, a two pound roller approximately three-and-a-half inches wide and one-and-a-half inches in diameter coated with VELCRO® hook material is rolled repeatedly over the loop pile carpet, for example, ten times. The carpet is then inspected for protruding fibers or fuzz. By "fuzz," it is meant short, individual filaments (often 1-3 stitch lengths long) removed from fiber bundles. The results are rated on a scale 1 to 4, with 4 being the best results. In one aspect, the composite disclosed herein can have a rating of at least 3 in the VELCRO® test. For example, the composite disclosed herein can have a rating of 4 in the VELCRO® test.

In one aspect, the composite disclosed herein has a suitable delamination strength at an interface between the woven fabric, a non-woven fabric, or a knitted face fabric and the nonwoven backing material as measured by ASTM D3936. For example, the composite disclosed herein can have delamination strength at an interface between the woven fabric, a non-woven fabric, or a knitted face fabric and the nonwoven backing material of at least 2 lbs/inch as measured by ASTM D3936. In another example, the composite disclosed herein can have delamination strength at an interface between the woven fabric, a non-woven fabric, or a knitted face fabric and the nonwoven backing material of at least 4 lbs/inch as measured by ASTM D3936. In yet another example, the composite disclosed herein can have delamination strength at an interface between the woven fabric, a non-woven fabric, or a knitted face fabric and the nonwoven backing material of at least 6 lbs/inch as measured by ASTM D3936. In yet another example, the composite disclosed herein can have delamination strength at an interface between the woven fabric, a non-woven fabric, or a knitted face fabric and the nonwoven backing material of at least 8 lbs/inch as measured by ASTM D3936. In yet another example, the composite disclosed herein can have delamination strength at an interface between the woven fabric, a non-woven fabric, or a knitted face fabric and the nonwoven backing material of at least 10 lbs/inch as measured by ASTM D3936. In yet another example, the composite disclosed herein can have delamination strength at an interface between the woven fabric, a non-woven fabric, or a knitted face fabric and the nonwoven backing material from 2-15 lbs/inch as measured by ASTM D3936. In yet another example, the composite disclosed herein can have delamination strength at an interface between the woven fabric, a non-woven fabric, or a knitted face fabric and the nonwoven backing material from 4-10 lbs/inch as measured by ASTM D3936. In yet another example, the composite disclosed herein can have delamination strength at an interface between the woven fabric, a non-woven fabric, or a knitted face fabric and the nonwoven backing material from 6-15 lbs/inch as measured by ASTM D3936. In yet another example, the composite disclosed herein can have delamination strength at an interface between the woven fabric, a non-woven fabric, or a knitted face fabric and the nonwoven backing material from 7-15 lbs/inch as measured by ASTM D3936. In yet another example, the composite disclosed herein can have delamination strength at an interface between the woven fabric, a non-woven fabric, or a knitted face fabric and the nonwoven backing material from 6-10 lbs/inch as measured by ASTM D3936. In yet another example, the composite disclosed herein can have delamination strength at an interface between the woven fabric, a non-woven fabric, or a knitted face fabric and the nonwoven backing material from 8-15 lbs/inch as measured by ASTM D3936. In yet another example, the composite disclosed herein can have delamination strength at an interface between the woven fabric, a non-woven fabric, or a knitted face fabric and the nonwoven backing material from 7-10 lbs/inch as measured by ASTM D3936.

In certain aspects, the composite further comprises a decorative portion, which can comprises a decorative substrate layer or a decorative surface layer. As used herein, it should be understood that the term decorative substrate layer and decorative surface layer can be used interchangeably. In some aspects, the decorative surface layer can comprises polyvinyl chloride (PVC), whitened PVC, opaque PVC, oriented polypropylene (OPP), polyolefin (PO), woven polyethylene (PE), non-woven PE, woven polypropylene (PP), nonwoven PP, woven PET, whitened fiber PET, non-woven PET, woven nylon, nonwoven nylon, conventional paper, conventional foil, or foiled oriented polypropylene. In still further aspects, the decorative surface layer can comprise one or more of a heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPS), polycarbonate, polyethylene (PE), or a copolymer thereof.

In certain aspects, the decorative surface layer has a thickness from about 1 mil to about 20 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 16 mil, about 17 mil, about 18, mil, and about 19 mil. In still further aspects, the substrate layer can have any thickness in a range derived from any two of the above listed exemplary values. For example, the decorative substrate layer can comprise a thickness in a range of from about 1 mil to about 5 mil, or from about 3 mil to about 7 mil, or from about 7 mil to about 20 mil. In still further aspects, the decorative substrate layer can be a film.

In yet other aspects, the decorative portion comprises an image layer. In certain aspects, the image layer is printed or otherwise transferred on a surface of the decorative substrate layer or the decorative surface layer. In yet other aspects, the image layer is printed or otherwise transferred on a surface of any visible layer. In some aspects, the decorative substrate layer and the visible layer are the same. In other aspects, the decorative substrate layer and the visible layer are different.

In yet other aspects, the decorative portion can be affixed to the second surface of the woven fabric, the non-woven fabric, or the knitted face fabric by any other known in the art methods. In some exemplary aspects, the decorative portion can be affixed to the second surface of the woven fabric, the non-woven fabric, or the knitted face fabric by needling. For example, the decorative portion comprising a plurality of whitened PET fibers as a substrate can be affixed to the second surface of the woven fabric, the non-woven fabric, or the knitted face fabric by needling. In one aspect, the needling can be done at a needle density of at least 1 punch/cm². For example, the needling can be done at a needle density of at least 5 punches/cm². In another example, the needling can be done at a needle density of at least 10 punches/cm². In yet another example, the needling can be done at a needle density of at least 50 punches/cm². In yet another example, the needling can be done at a needle density of at least 100 punches/cm². In yet another example, the needling can be done at a needle density of at least 200 punches/cm². In yet another example, the needling can be done at a needle density of from 5 punches/cm² to 300 punches/cm², or from 50 punches/cm² to 200 punches/cm². The needling can also be done at a suitable penetration depth, for example from 2 mm to 15 mm. The penetration depth can be determined by the thickness of the woven fabric, the non-woven fabric, or the knitted face fabric.

In other aspects, decorative portion affixed by needling can be further heat pressed to the second surface of the woven fabric, the non-woven fabric, or the knitted face fabric. In these aspects, the image layer can be formed by a direct printing on the substrate, after the decorative portion is affixed to the second surface of the woven fabric, the non-woven fabric, or the knitted face fabric. In such aspects, the randomly oriented fibers with a base shade of white or near white can be affixed to the second surface of the woven fabric, the non-woven fabric, or the knitted face fabric. The fibers used to form this substrate can comprise at least about 10%, at least about 20%, at least about 30%, at least about 40%, at least about 50%, at least about 60%, at least about 70%, at least about 80%, at least about 90%, or at least about 95% of a low melt fiber which can create a bond to the rigid core when heated to a temperature from about 110 to about 250° C., including exemplary values of about 120° C., about 130° C., about 140° C., about 150° C., about 160° C., about 170° C., about 180° C., about 190° C., about 200° C., about 210° C., about 220° C., about 230° C., and about 240° C. In yet other aspects, the resulting surface can be further flattened to maintain a level of smoothness allowing the transferred image to have a sufficient detail by a belt or use of a release film or paper.

In some aspects, the image layer can comprise any conventional ink, dye, pigment, or other marking substance that can be applied in a desired pattern. For example and without limitation, the image layer can comprise water-based, soy-based, a UV-cured inks, and/or solvent-based pigments. In still further aspect, the image layer is a UV cured ink.

It is understood that UV-cured inks can comprise photoinitiators, pigments, additives, monomers and oligomers of various polymers, and the like. In some exemplary aspects, the UV-cured inks can comprise, without limitation, (5-ethyl-1,3-dioxan-5yl)methyl acrylate, 2-phenoxyethyl acrylate; 1-vinylhexahydro-2H-azepin-2-one, substituted phosphine oxide, trimethylolpropane triacrylate, phenyl bis (2,4 6-trimethylbenzoyl)phosphine oxide, epoxy acrylate oligomer, diacrylate monomer, multi-functional monomers, amine modified acrylate oligomer, 1-vinylhexahydro-2H-asepin-2-one, diacrylate oligomers, benzophenone, triacrylate monomers, 1-hydroxy-cyclohexylphenyl-ketone, 2 hydroxy-2-methylpropiophenone, and the like.

It is further understood that the image layer can be applied to the decorative substrate layer or decorative surface layer or any other visible layer by any conventional printing means, which can include, without limitation, directly printing, rotogravure printing, digital printing, silk screen printing, flexography printing, lithography printing, offset-lithography printing, relief printing, thermography printing, thermal sublimation printing, dye-sublimation printing, heat-transfer printing, digital printing, and the like. In yet other aspects, the image layer can be applied by reverse printing. In such exemplary aspects, the image is printed on an underside of the clear film rather than top side of the film. In another aspect, the woven fabric, the non-woven fabric, or the knitted face fabric can have an applied coating to prime the surface and provide a printable layer. The applied coating can be UV cured, e-beam cured, or cured by other known energy types. The applied coating can be used to smooth the surface and change the texture of the woven fabric, the non-woven fabric, or the knitted face fabric prior to applying the decorative substrate layer or decorative surface layer.

In still further aspects, the image layer can be applied by a digital printing. In some aspects, the image layer is applied prior to affixing the decorative portion to the composite. In other aspects, the image layer is applied after the decorative portion is affixed to the composite. In an exemplary aspect, the image layer can comprise inks and pigments manufactured by INX Inks, Durst, HP, EFI, Sun Chemical, DyStar, Sensient Inks Technologies, Kao Collins, Mankiewicz, Marabu, Borbeaux or Tiger. In yet other aspects, the image layer can be digitally printed utilizing digital printers manufactured by Cefla, Durst, Hymmen, EFI, Barbaran, Zimmer Austria, HP, Fujifilm, Mimaki, AGFA. Kodak, Canon, Epson, KBA, OKI, Ricoh, Heidelberg, Mutoh or Inca.

In certain aspects, the formed image layer can be a continuous layer that covers substantially all of the top surface of the substrate. In yet other aspects, the formed image layer can be a discontinuous layer that covers only a portion of the top surface of the substrate. In yet other aspects, the image layer can have any desired aesthetic appearance. In some exemplary aspects, the image layer can have an appearance of simulated hardwood or ceramic flooring.

In some aspects, the decorative layer portion can have any suitable weight and thickness. In some embodiments, the decorative layer portion has a weight of from about 0.2 ounces per square yard to about 1.0 ounce per square yard, including, without limitation, decorative layer portions having a weight of about 0.3, 0.4, 0.5, 0.6, 0.7, 0.8, and 0.9 ounces per square yard. In a further aspect, a decorative layer portion can have a total thickness of from about 1 mil to about 50 mil, including exemplary values of about 2 mil, about 3 mil, about 4 mil, about 5 mil, about 6 mil, about 7 mil, about 8 mil, about 9 mil, about 10 mil, about 11 mil, about 12 mil, about 13 mil, about 14 mil, about 15 mil, about 20 mil, about 25 mil, about 30 mil, and about 40 mil; although virtually any thickness can be used.

In an additional aspect, any of aesthetic layers described above can be adhered to any foregoing substrate.

In yet other aspects, the decorative portion further comprises a wear layer adhered to the image layer. In yet other aspects, the wear layer is not present. In the aspects where the wear layer is present, the wear layer can comprise, for example and without limitation, conventional ionomers, polyethylene terephthalate (PET), polyurethane, polypropylene, polytrimethylene terephthalate (PTT), polyamide, polyvinyl chloride (PVC), and the like. In a further aspect, the wear layer can comprise surlyn resin, such as, for example and without limitation, Surlyn® 1706 resin, manufactured by E.I. du Pont de Nemours and Company, Inc.

In a still further aspect, the wear layer can comprise heat stabilized biaxially-oriented PET (BoPET), amorphous PET (aPET), recycled PET (rPET), polyethylene terephthalate glycol-modified (PETG), polyolefin, cyclic olefin copolymer (COC), cyclic olefin polymer (COP), polyvinylidene fluoride (PVDF), polylactic acid (PLA) copolymers, nylon, cellulose acetate, poly(methyl methacrylate) (PMMA), thermoplastic polyurethane (TPU), thermoplastic elastomers (TPE), polycarbonate, polyethylene (PE), high density polyethylene (HDPE), low density polyethylene (LDPE), or a copolymer thereof.

In some aspects, the wear layer is substantially transparent. In other aspects, the wear layer is substantially opaque.

In a yet further aspect, the wear layer can have a thickness in the range of greater than 0 mil to about 30 mil, including exemplary thickness ranges of from about 0.5 mil, about 1 mil, about 1.5 mil, about 2 mil, about 2.5 mil, about 3 mil, about 3.5 mil, about 4 mil, about 5 mil, about 6 mil, about 7 mil, about 8 mil, about 9, about 10 mil, about 12 mil, about 15 mil, about 17 mil, about 20 mil, about 22 mil, about 25 mil, and about 27 mil. In a still further aspect, the thickness of the wear layer can be in a range derived from any of the above listed exemplary values. For example, the thickness can in the range up to 4 mil, or in the range from about 4 mil to about 9 mil, or from 4 mil to about 16 mil.

In some aspects, the wear layer is laminated to the decorative portion. In still other aspects, the wear layer is UV cured to the decorative portion. In some aspects, where the wear layer is not present, a spray material can be applied to the top surface of the decorative portion. In such aspects, the sprayed material can serve as a scratch coat. In such aspect, the sprayed material can produce a hydrophobic coating on the wear layer. For example, a fluorinated material can be used as the sprayed material to serve as a hydrophobic coating and/or a soil protection layer. In another example, a non-fluorinated material can be used as the sprayed material to serve as a hydrophobic coating and/or a soil protection layer. Suitable fluorinated and non-fluorinated material are known to those of skill in the art and are commercially available.

In certain aspects, the decorative portion has a top layer. In yet other aspects, a top surface of the decorative portion is embossed or embossed in register. It is understood that in the aspects, where the wear layer is present, the top layer of the decorative portion is the wear layer. In the aspects, where the wear layer is absent, but the decorative portion comprises a substrate layer, a substrate surface is the top layer of the decorative portion. In the aspects, where any additional aesthetic layers are present and the wear layer is absent, a surface aesthetic layer is the top surface of the decorative portion. In certain aspects, the wear layer is a scratch layer. In the aspects where the wear layer is not present, the scratch layer can be directly applied to the top surface of the decorative layer. It is understood that the scratch layer can be applied by any known in the art methods. In some aspects, the scratch layer can comprise any materials suitable for this purpose. In still further aspects, the scratch layer can comprise transparent polyurethane based materials or transparent acrylic based materials. In still further aspects, the scratch layer can be UV cured.

The embossing can be done to provide visuals and textures to duplicate wood grain, slate and other visuals. Laser etching can also be utilized in lieu of embossing to achieve the desired aesthetics. Some other potential methods for texturing the surface of flooring materials, wall boards, ceilings, or roofing products include drag wiring while the temperature of an extruded product is still above glass transition temperature or dragging probes across the surface while the product or probe is moving. Further, a texture can be embedded in the surface of an injection mold, compression mold or vacuum form mold, as well. A texture can also be hot or cold stamped with pressure for creating the desired look. It is understood that embossing can be done by any techniques known in the art. In some aspects, embossing roller, film, or UV "freeze" embossing can be used. In still further aspects, the embossing can be done by using heat or inert UV cure under film or band. In some exemplary aspects, the embossing can be done by applying a viscous liquid that can be cured and crosslinked. In some further aspects, a film with a texture can be applied to the viscous liquid that is then cured through the film to form a textured surface mirroring the texture that was present on the textured film.

In certain aspects, the embossing can be pressed in or cured in the scratch or wear layer. In other aspects, the image layer comprising embossing can be pressed into or cured into the scratch or the wear layer by various means, for example and without limitation, by a UV cure molding method.

Method

Also disclosed is a method for making a composite, such as a composite disclosed herein. The method disclosed herein comprises a) providing a woven fabric, a non-woven fabric, or a knitted face fabric having a first surface and an opposing second surface, wherein the first surface of the woven fabric, the non-woven fabric, or the knitted face fabric contacts a first surface of a nonwoven backing material, wherein:
  i) the woven fabric, the non-woven fabric, or the knitted face fabric is needle punched such that fibers protrude from the first surface the woven fabric, the non-woven fabric, or the knitted face fabric into the nonwoven backing material;
  ii) the woven fabric, the non-woven fabric, or the knitted face fabric comprises a first polymer having a first melting point having a first melting point and a second polymer having a second melting point being higher than the first melting point;

b) forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point; and c) applying heat thereby at least partially melting or softening the first polymer and the third polymer such that they bond together, wherein the combination of step b) and step c) forms a composite material.

In one aspect, the step of forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point is performed before the step of applying heat thereby at least partially melting or softening the first polymer and the third polymer such that they bond together.

In one aspect, the step of forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point is performed simultaneously as the step of applying heat thereby at least partially melting or softening the first polymer and the third polymer such that they bond together.

In one aspect, the step of forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point is performed after the step of applying heat thereby at least partially melting or softening the first polymer and the third polymer such that they bond together.

In still further aspects, at least one of the first, second, third, or fourth fiber can be a multi-component fiber. In some aspects, the multi-component fibers comprise a sheath-core configuration. In still further aspects, described herein, the multi-component fiber can comprise at least first component having the first melting point and at least second component having the second melting point different from the first melting point.

The step of forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point can be performed by subjecting the material to a pressure from above 0 to about 1,200 pounds per square inch (psi), including for example, from about 10 psi to about 500 psi, 100 to 1,000 psi, from about 250 to 1,000 psi, from about 400 to about 950 psi, from about 500 to 750 psi, or from about 600 to 700 psi.

The compressing step can be done with a press that have heated plates, where one plate contacts the woven fabric, the non-woven fabric, or the knitted face fabric and the other opposing plate contacts the nonwoven backing, and also simultaneously performs the heating step. Each plate can have a temperature from about 100° C. to about 300° C., such as from about 125° C. to about 200° C., such as from about 125° C. to about 175° C., such as from about 140° C. to about 160° C. The compression step can be performed by a press, for example, a Carver press.

The step of forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point can be performed by subjecting the material to a pressure from 1 second to 300 seconds, for example from 1 second to 200 seconds, from 1 second to 100 seconds, from 1 second to 50 seconds, from 1 second to 25 seconds, from 25 seconds to 200 seconds, and from 25 seconds to 100 seconds.

In the disclosed method the step of applying heat to at least partially melts or softens the first polymer and the third polymer such that they bond together. In one aspect, the step of applying the heat does not partially melt or soften the second polymer and the fourth polymer. The first and third polymer also bond to the second polymer and the fourth polymer in the process.

The step of applying heat to at least partially melts or softens the first polymer and the third polymer such that they bond together can be done at a temperature that at least partially melts or softens the first polymer and the third polymer, wherein the first polymer and the third polymer has a melting temperature from about 80° C. to about 250° C. For example, the melting point of the first polymer can be from about 95° C. to about 250° C. In yet another example, the melting point of the first polymer can be from about 110° C. to about 250° C. In yet another example, the melting point of the first polymer can be from about 95° C. to about 230° C. In yet another example, the melting point of the first polymer can be from about 95° C. to about 210° C. In yet another example, the melting point of the first polymer can be from about 95° C. to about 190° C. In yet another example, the melting point of the first polymer can be from about 95° C. to about 170° C. In yet another example, the melting point of the first polymer can be from about 110° C. to about 150° C. In yet another example, the melting point of the first polymer can be from about 130° C. to about 250° C. In yet another example, the melting point of the first polymer can be from about 150° C. to about 250° C. In yet another example, the melting point of the first polymer can be from about 170° C. to about 250° C. In yet another example, the melting point of the first polymer can be from about 190° C. to about 250° C. In yet another example, the melting point of the first polymer can be from about 210° C. to about 250° C. In yet another example, the melting point of the first polymer can be from about 130° C. to about 210° C. In yet another example, the melting point of the first polymer can be from about 95° C. to about 150° C. In yet another example, the melting point of the first polymer can be from about 95° C. to about 130° C. In yet another example, the melting point of the first polymer can be from about 110° C. to about 150° C.

For example, the melting point of the third polymer can be from about 80° C. to about 250° C. For example, the melting point of the third polymer can be from about 95° C. to about 250° C. In yet another example, the melting point of the third polymer can be from about 110° C. to about 250° C. In yet another example, the melting point of the third polymer can be from about 95° C. to about 230° C. In yet another example, the melting point of the third polymer can be from about 95° C. to about 210° C. In yet another example, the melting point of the third polymer can be from about 95° C. to about 190° C. In yet another example, the melting point of the third polymer can be from about 95° C. to about 170° C. In yet another example, the melting point of the third polymer can be from about 110° C. to about 150° C. In yet another example, the melting point of the third polymer can be from about 130° C. to about 250° C. In yet another example, the melting point of the third polymer can be from about 150° C. to about 250° C. In yet another example, the melting point of the third polymer can be from about 170° C. to about 250° C. In yet another example, the melting point of the third polymer can be from about 190° C. to about 250° C. In yet another example, the melting point of the third polymer can be from about 210° C. to about 250° C. In yet another example, the melting point of the third polymer can be from about 130° C. to about 210° C. In yet another example, the melting point of the third polymer can be from about 95° C. to about 150° C. In yet another example, the melting point of the third polymer can be from about 95° C. to about 130° C. In yet another example, the melting point of the third polymer can be from about 110° C. to about 150° C.

In certain aspects, an oven can be utilized for the step of applying heat. The oven can have a temperature that is above the melting point of the first polymer and the third polymer, but below the melting temperature of the second polymer and the fourth polymer. In yet other aspects, it is understood that any known in the art heating means can be utilized. For example, in some aspects, the compressed material can be hot oil calendared. In still further aspects, the heat and pressure can come from continuous double belted presses, for example, commercially available from TPS-Sandvik, Meyer, Held, Schott and Meissner, IPCO, Berndorf, or Hymmen. In yet other aspects, the heat and pressure can come from single and multiple opening static presses.

The compressing step can for example be done with a press that have heated plates, where one plate contacts the woven fabric, the non-woven fabric, or the knitted face fabric and the other opposing plate contacts the nonwoven backing, and also simultaneously performs the heating step. Each plate can have a temperature from about 100° C. to about 300° C., such as from about 125° C. to about 200° C., such as from about 125° C. to about 175° C., such as from about 140° C. to about 160° C. The compression step can be performed by a press, for example, a Carver press.

In the aspect when the step of applying heat is performed prior to the compressing step, a cool compressing step can be used.

In one aspect, providing a woven fabric, a non-woven fabric, or a knitted face fabric having a first surface and an opposing second surface, wherein the first surface of the woven fabric, the non-woven fabric, or the knitted face fabric contacts a first surface of a nonwoven backing material, wherein the woven fabric, the non-woven fabric, or the knitted face fabric is needle punched such that fibers protrude from the first surface the woven fabric, the non-woven fabric, or the knitted face fabric into the nonwoven backing material is such that the fibers from the woven fabric, the non-woven fabric, or the knitted face fabric interlock with fibers of the nonwoven backing.

In some aspects, the method further comprises the step of affixing of a decorative portion to the second surface of the woven fabric, the non-woven fabric, or the knitted face fabric. Such a step can comprise applying an adhesive, such as applying an adhesive to the second surface of the woven fabric, the non-woven fabric, or the knitted face fabric. In some aspects, it is understood that the adhesive material can be applied by any known in the art methods. In some aspects, the adhesive can be applied as a hot melt. In other aspects, the adhesive can be extruded on the second surface of the woven fabric, the non-woven fabric, or the knitted face fabric. In yet other aspects, the adhesive material can be applied as an aqueous dispersion.

In yet other aspects, the method further comprises applying an image substrate layer described above. The image substrate layer can be applied by any known in the art methods, for example by nip roll method, or any lamination method known in the art.

In yet other aspects, the decorative portion can be affixed to the second surface of the woven fabric, the non-woven fabric, or the knitted face fabric by any other known in the art methods. In some methods the step of affixing comprises needling the second surface of the decorative portion with the opposing second surface of the woven fabric, the non-woven fabric, or the knitted face fabric. In certain aspects, after the decorative portion adhered to the second surface of the woven fabric, the non-woven fabric, or the knitted face fabric, the heat press can be applied at a temperature from about 110° C. to about 250° C. and under sufficient pressure to adhere the decorative portion to the second surface of the woven fabric, the non-woven fabric, or the knitted face fabric. In yet other aspects, the decorative portion can be affixed to the first surface of the second surface of the woven fabric, the non-woven fabric, or the knitted face fabric by needling. For example, the decorative portion comprising a plurality of whitened PET fibers as a decorative substrate or a decorative surface layer can be affixed to the first surface of the second surface of the woven fabric, the non-woven fabric, or the knitted face fabric by needling. In other aspects, decorative portion affixed by needling can be further heat pressed to the second surface of the woven fabric, the non-woven fabric, or the knitted face fabric. It is understood that the image layer can be transferred to any visible surface of the article by any known in the art methods. In some aspects, the image layer can be formed by directly printing on the substrate after the decorative portion is affixed to the second surface of the woven fabric, the non-woven fabric, or the knitted face fabric. In yet other aspects, the image layer can be transferred by other methods that include but are not limited to rotogravure, digital and direct pad printing, screen printing, or sublimation after the decorative portion is affixed to the second surface of the woven fabric, the non-woven fabric, or the knitted face fabric.

In yet other aspects, the method further comprises a step of applying a wear layer having a first surface and an opposed surface. In still further aspects, the wear layer overlies the decorative portion such that a second surface of the wear layer is in contact with the first surface of the decorative portion. It is understood that the wear layer can be applied by any known in the art methods. In some aspects, the wear layer is applied by a nip roll method. In these aspects, the wear layer is applied to the decorative layer and is laminated by passing through an additional nip roller. In other aspects, the wear layer can be UV cured. In one aspect, the wear layer can be an acrylic material.

For example, the top surface of the decorative layer can optionally be post pressed, smoothed, embossed or contoured to obtain various functional or aesthetic effects. Additionally, other optional materials can be applied to composite layer or the formed composite during the manufacturing process. For example, an anti-slip coating can be present on the surface intended to interact with the substrate on which the disclosed composite is to be applied. In another example, the composite can further comprise a foam backing layer.

In various aspects, the layered composite articles of the present invention advantageously exhibit higher radiant panel ratings, reduced squeakiness, improved sound reduction properties and less embodied energy.

Aspects

In view of the disclosure herein below are described certain more particularly described aspects of the inventions. These particularly recited aspects should not however be interpreted to have any limiting effect on any different claims containing different or more general teachings described herein, or that the "particular" aspects are somehow limited in some way other than the inherent meanings of the language and formulas literally used therein.

Aspect 1: A composite comprising:
a) a woven fabric, a non-woven fabric, or a knitted face fabric having a first surface and an opposing second surface, wherein:
  i. the woven fabric, the non-woven fabric, or the knitted face fabric is needle punched such that fibers protrude from the first surface the woven fabric, the non-woven fabric, or the knitted face fabric;
  ii. the woven fabric, the non-woven fabric, or the knitted face fabric comprises a first polymer having a first melting point and a second polymer having a second melting point being higher than the first melting point;
b) a nonwoven backing material having a first surface and an opposing second surface, wherein the nonwoven backing material comprises a third polymer having a third melting point and a fourth polymer having a fourth melting point being higher than the third melting point,
wherein the fibers protruding from the first surface the woven fabric, the non-woven fabric, or the knitted face fabric are interlocked with the first surface of the nonwoven backing material, and
wherein the woven fabric, the non-woven fabric, or the knitted face fabric is further bonded to the nonwoven backing material by applying heat to at least partially melt or soften the first polymer and the third polymer such that they bond together.

Aspect 2: The composite of aspect 1, wherein the composite comprises a woven fabric having the first surface and the opposing second surface.

Aspect 3: The composite of aspect 1, wherein the composite comprises a non-woven fabric having the first surface and the opposing second surface.

Aspect 4: The composite of aspect 1, wherein the composite comprises a knitted face fabric having the first surface and the opposing second surface.

Aspect 5: The composite of any one of aspect 1-4, wherein the first polymer, second polymer, third polymer, and fourth polymer each independently comprises polyester, polypropylene, polyethylene, polyamides, polyurethane, polylactic acid, acetal, co-polyester, co-polyamide, polystyrene, modacrylic, or a combination thereof.

Aspect 6: The composite of any one of aspect 1-5, wherein the first polymer and the second polymer are present in a multi-component fiber.

Aspect 7: The composite of aspect 6, wherein the multi-component fiber comprise a sheath core configuration.

Aspect 8: The composite of any one of aspect 1-7, wherein the third polymer and the fourth polymer are present in a multi-component fiber.

Aspect 9: The composite of aspect 8, wherein the multi-component fiber comprise a sheath core configuration.

Aspect 10: The composite of any one of aspect 1-9, wherein the composite comprises 100 wt % of polyester.

Aspect 11: The composite of any one of aspect 1-10, wherein the first polymer, second polymer, third polymer, and fourth polymer each comprises polyester.

Aspect 12: The composite of any one of aspect 1-11, wherein the melting point of the first polymer is from about 110° C. to about 250° C.

Aspect 13: The composite of any one of aspect 1-12, wherein the melting point of the second polymer is from about 130° C. to about 450° C.

Aspect 14: The composite of any one of aspect 1-13, wherein the melting point of the third polymer is from about 110° C. to about 250° C.

Aspect 15: The composite of any one of aspect 1-14, wherein the melting point of the fourth polymer is from about 130° C. to about 450° C.

Aspect 16: The composite of any one of aspect 1-15, wherein the first polymer and the third polymer are identical.

Aspect 17: The composite of any one of aspect 1-16, wherein the second polymer and the fourth polymer are identical.

Aspect 18: The composite of any one of aspect 1-17, wherein the first polymer and the third polymer have substantially identical melting temperatures.

Aspect 19: The composite of any one of aspect 1-18, wherein the first polymer and third polymer are bonded to the second polymer and the fourth polymer.

Aspect 20: The composite of any one of aspect 1-19, wherein the melting point of the second polymer is at least 20° C. higher than the melting point of the first polymer.

Aspect 21: The composite of any one of aspect 1-20, wherein the melting point of the fourth polymer is at least 20° C. higher than the melting point of the third polymer.

Aspect 22: The composite of any one of aspect 1-21, wherein the woven fabric, the non-woven fabric, or the knitted face fabric comprises from about 10 wt % to about 40 wt % of the first polymer, and from about 90 wt % to about 60 wt % of the second polymer.

Aspect 23: The composite of any one of aspect 1-22, wherein the nonwoven backing material comprises from about 20 wt % to about 60 wt % of the third polymer, and from about 80 wt % to about 40 wt % of the second polymer.

Aspect 24: The composite of any one of aspect 1-23, wherein the composite does not comprise an adhesive layer.

Aspect 25: The composite of any one of aspect 1-24, wherein the composite has a density of at least 10 lbs/ft$^3$.

Aspect 26: The composite of any one of aspect 1-25, wherein the composite has delamination strength at an interface between the woven fabric, a non-woven fabric, or a knitted face fabric and the nonwoven backing material from 2-15 lbs/inch as measured by ASTM D3936.

Aspect 27: The composite of any one of aspect 1-26, wherein the composite has a three dimensional shape.

Aspect 28: A method comprising:
a) providing a woven fabric, a non-woven fabric, or a knitted face fabric having a first surface and an opposing second surface, wherein the first surface of the woven fabric, the non-woven fabric, or the knitted face fabric contacts a first surface of a nonwoven backing material, wherein:
  i. the woven fabric, the non-woven fabric, or the knitted face fabric is needle punched such that fibers protrude from the first surface the woven fabric, the non-woven fabric, or the knitted face fabric into the nonwoven backing material;
  ii. the woven fabric, the non-woven fabric, or the knitted face fabric comprises a first polymer having a first melting point having a first melting point and a second polymer having a second melting point being higher than the first melting point;
b) forming a compressed material by compressing the first surface of the woven fabric, the non-woven fabric, or the knitted face fabric to the first surface of the nonwoven backing material, wherein the nonwoven backing material comprises third polymer having a third melting point and a fourth polymer having a fourth melting point being higher than the third melting point; and
c) applying heat thereby at least partially melting or softening the first polymer and the third polymer such that they bond together wherein the combination of step b) and step c) forms a composite material.

Aspect 29: The method of aspect 28, wherein step b) is performed before step c).

Aspect 30: The method of aspect 28, wherein step c) is performed before step b).

Aspect 31: The method of aspect 28, wherein steps b) and c) are performed simultaneously.

Aspect 32: The method of any one of aspects 28-31, wherein compressing comprises compressing from 1 second to 300 seconds.

Aspect 33: The method of any one of aspects 28-32, wherein compressing comprises compressing at a pressure from above 0 to about 1,200 pounds per square inch.

Aspect 34: The method of any one of aspects 28-33, wherein applying the heat does not partially melt or soften the second polymer and the fourth polymer.

Aspect 35: The method of any one of aspects 28-34, wherein the formed composite is a composite of any one of aspects 1-27.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for.

Unless indicated otherwise, parts are parts by weight, temperature is degrees C. or is at ambient temperature, and pressure is at or near atmospheric or full vacuum.

A. Example 1

Sample 1 is a 46 oz/yd$^2$ composite sample that was produced according to the disclosure herein. A woven jacquard fabric was used that had a blend of a modacrylic (first) fiber and a polyester (second) fiber, wherein the modacrylic fiber has a higher melting point as compared to the polyester fiber. The modacrylic fiber is present in 80% and the polyester fiber is present in 20% in the woven jacquard fabric. A nonwoven backing was used that had a blend of a high melting point polyester (third) fiber and a low melting point polyester (fourth) fiber. The woven jacquard fabric was placed on top of the nonwoven backing and a needling process using a Needleloom was used to needlepunch the woven jacquard fabric and the nonwoven backing to interlock the fibers of the woven jacquard fabric with surface of the nonwoven backing. A Carver press having both top and bottom plates at 300 F was used to press the sample having a dimension of 12"×12" at 8,100 lbf (force pounds) for 2 min to form a composite. The heating and pressing step caused the lower melting point polyester fibers in the needlepunched woven jacquard fabric and the needlepunched nonwoven backing to melt and bond to each other and to the modacrylic fiber and the high melting point polyester fiber. The dry delamination strength of the formed composite was measured using ASTM D3936. The dry delamination strength of sample 1 was 8.0 lbs/in according to ASTM D3936.

Control sample 1 is a 46 oz/yd$^2$ composite sample that has identical materials to sample 1. Control sample 1 was made without the use of a heating or pressing step. The dry delamination strength of control sample 1 was 0.5 lbs/in according to ASTM D3936.

Control sample 2 is a 46 oz/yd$^2$ composite sample that has identical materials to sample 1 except that the woven jacquard fabric and the nonwoven backing were not needlepunched together. The same heating and pressing process was used to make control sample 2 as was used to make sample 1. Thus, the difference between sample 1 and control sample 2 is that sample 1 needlepunched the woven jacquard fabric together with the non-woven backing while control sample 2 was not non-needlepunched. The dry delamination strength of control sample 2 was 1.3 lbs/in according to ASTM D3936.

Control sample 3 is a 50 oz/yd$^2$ composite sample that has identical materials to sample 1. Control sample 3 was made with a heating step but without a pressing step. The heating step of the control sample 3 was performed by subjecting the sample to an air oven at 275° F., which caused the lower melting point fibers in the woven jacquard fabric and the non-woven backing to melt. The dry delamination strength of control sample 3 was 4.9 lbs/in according to ASTM D3936.

Control sample 4 is a 65 oz/yd$^2$ sample that has identical materials to sample 1 except that the woven jacquard fabric and the nonwoven backing were not needlepunched together. The same heating and pressing process was used to make control sample 4 as was made to make sample 1. Thus, the difference between sample 1 and control sample 4 is that sample 1 needlepunched the woven jacquard fabric together with the nonwoven backing while control sample 4 was not non-needlepunched. Also the weight of the control sample 4 is about twice that of sample 1. The dry delamination strength of control sample 4 was 2.3 lbs/in according to ASTM D3936.

The data is summarized in Table 1 below.

| Sample Number | Dry delamination strength as measured by ASTM D3936 |
|---|---|
| Sample 1 | 8.0 lbs/in |
| Control Sample 1 | 0.5 lbs/in |
| Control Sample 2 | 1.3 lbs/in |
| Control Sample 3 | 4.9 lbs/in |
| Control Sample 4 | 2.3 lbs/in |

Table 1 shows that the combination of needlepunching, heating, and pressing unexpectedly produces a composite having a significantly improved delamination strength as measured by ASTM D3936, as compared to control samples.

B. Example 2

Figure 2:
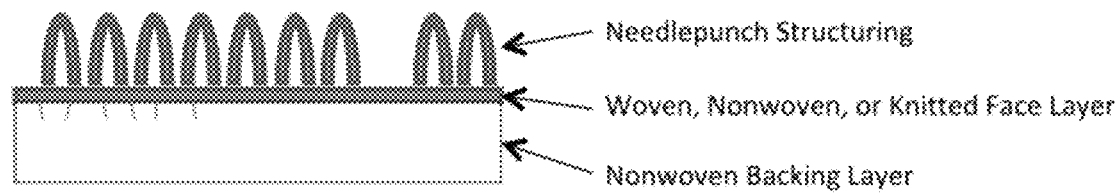
FIG. 2 shows a composite where a needlepunching produces structuring, wherein loops from the fibers are formed on the top surface of the woven fabric, the non-woven fabric, or the knitted face fabric.
Figure 3A:
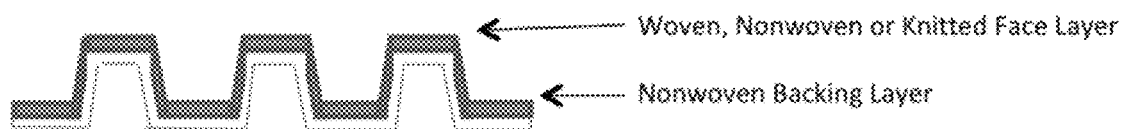
FIGS. 3A and 3B shows non-limiting examples of composites having a three dimensional shape.
Figure 3B:
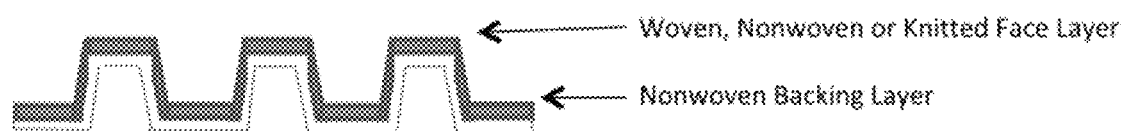
Figure 4:
FIG. 4 shows a textured or patterned composite wherein there is a pattern of the of woven fabric, the non-woven fabric, or the knitted face fabric on the nonwoven backing material.

FIG. 1 shows a schematic of a non-limiting example of a composite disclosed herein where a woven, non-woven or knitted fabric is first attached to a nonwoven backing fabric by a needlepunch process, which mechanically interlocks the fibers from the non-woven or knitted fabric with those of the nonwoven backing fabric. In one aspect, as shown in FIG. 2, the needlepunching produces structuring, wherein loops from the fibers are formed on the top surface of the woven fabric, the non-woven fabric, or the knitted face fabric. The final structure of the composite is produced after the compression and heating steps described herein. The composite can have a three dimensional shape which is formed from the compression step, as shown in FIGS. 3A and 3B. The composite can also be textured or patterned, as shown in FIG. 4, wherein the is a pattern of the of woven fabric, the non-woven fabric, or the knitted face fabric on the nonwoven backing material.

Figure 5:
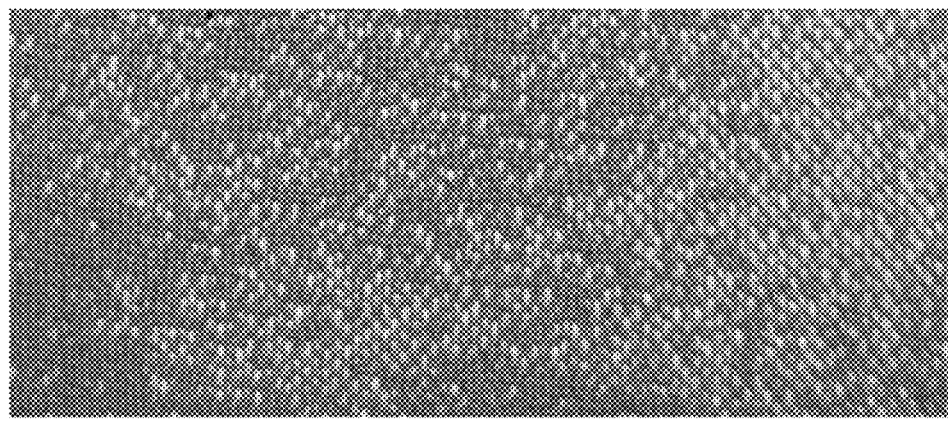
FIG. 5 is a photograph of a composite described herein.
Figure 6:
FIG. 6 is a photograph of a composite described herein.
Figure 7:
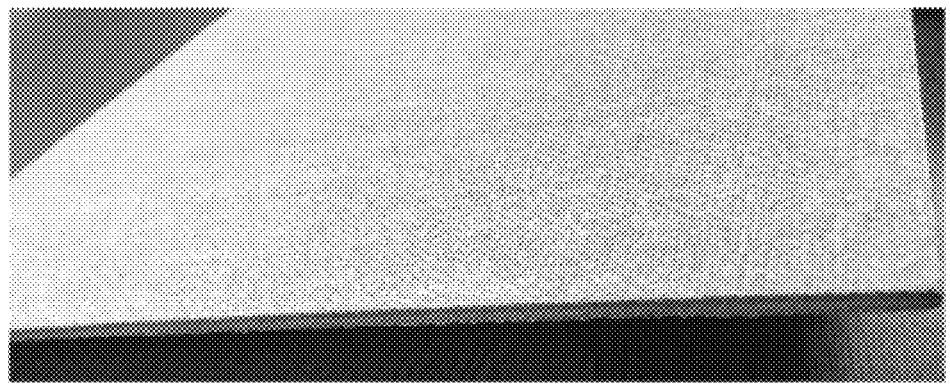
FIG. 7 is a photograph of a composite described herein.
Figure 8:
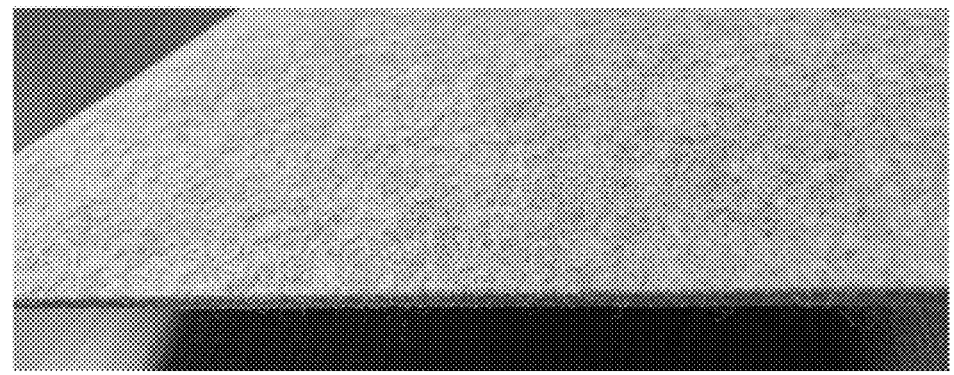
FIG. 8 is a photograph of a composite described herein.
Figure 9:
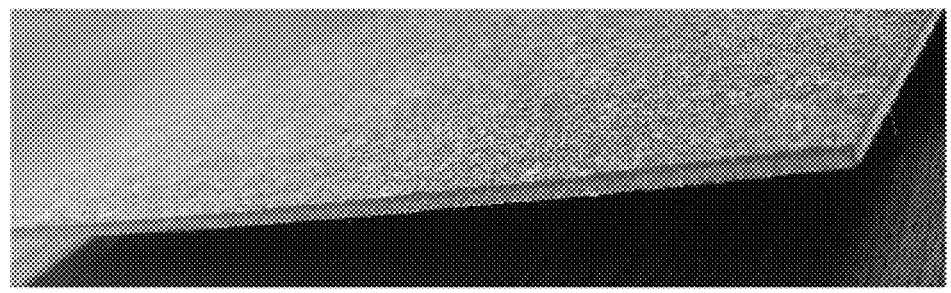
FIG. 9 is a photograph of a composite described herein.
Figure 10:
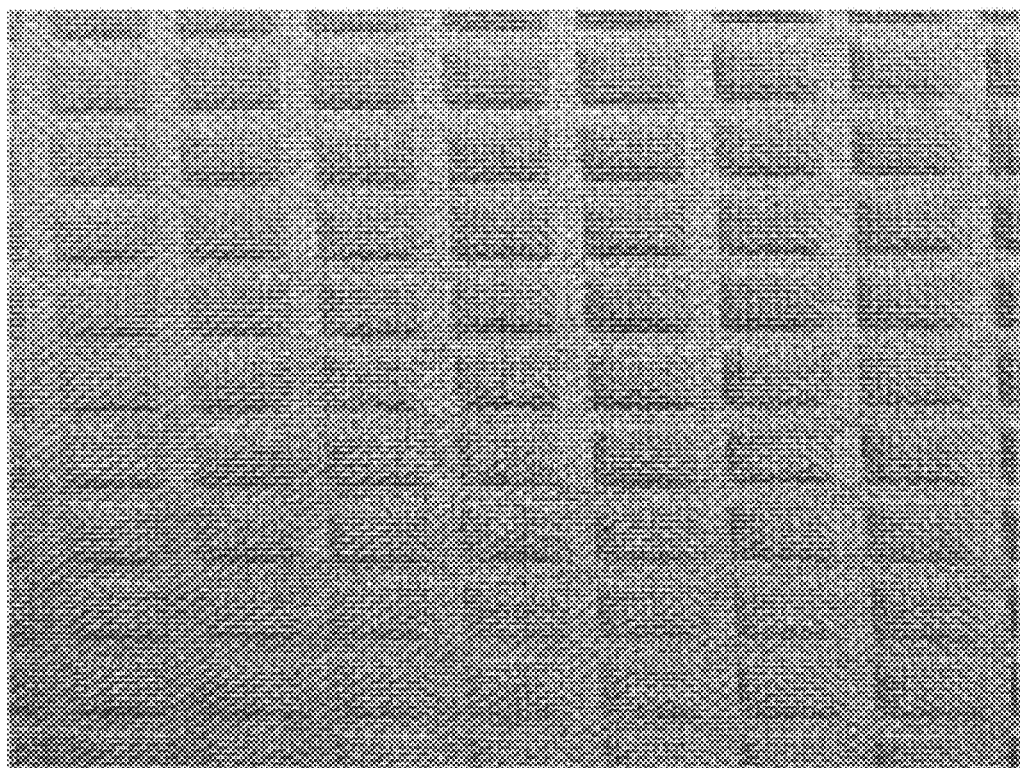
FIG. 10 is a photograph of a three dimensional composite described herein.
Figure 11:
FIG. 11 is a photograph of a three dimensional composite described herein.

Exemplary non-limiting samples of the composites were produced, as shown in FIGS. 5-11. FIG. 5 shows a composite of a woven face material attached to a nonwoven backing material. FIG. 6 shows a composite of a woven face material attached to a nonwoven backing material. FIG. 6 demonstrates that the composite can be cut without causing fraying of the woven face material. FIG. 7 shows another example of a composite of a woven face material attached to a nonwoven backing material. FIG. 8 shows an example of a composite of a non-woven face material attached to a nonwoven backing material. FIG. 9 shows an example of composite of a non-woven face material attached to a nonwoven backing material. FIG. 10 shows an example of a composite of a woven face material attached to a nonwoven backing material, wherein the composite is compressed to a three-dimensional shape during the manufacturing of the composite. FIG. 11 shows an example of a composite of a woven face material attached to a nonwoven backing material, wherein the composite is compressed to a three-dimensional shape during the manufacturing of the composite.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A composite comprising:
 a) a woven fabric, a non-woven fabric, or a knitted face fabric having a first surface and an opposing second surface, wherein:
  i. the woven fabric, the non-woven fabric, or the knitted face fabric is needle punched such that fibers protrude from the first surface of the woven fabric, the non-woven fabric, or the knitted face fabric; and
  ii. the woven fabric, the non-woven fabric, or the knitted face fabric comprises a first polymer having a first melting point and a second polymer having a second melting point being higher than the first melting point;
 b) a nonwoven backing material having a first surface and an opposing second surface, wherein the nonwoven backing material comprises a third polymer having a third melting point and a fourth polymer having a fourth melting point being higher than the third melting point;
 wherein the fibers protruding from the first surface the woven fabric, the non-woven fabric, or the knitted face fabric are interlocked with the first surface of the nonwoven backing material;
 wherein the woven fabric, the non-woven fabric, or the knitted face fabric is further bonded to the nonwoven backing material by compressing and applying heat to at least partially melt or soften the first polymer and the third polymer such that they bond together; and
 wherein the composite has a dry delamination strength at an interface between the woven fabric, the non-woven fabric, or the knitted face fabric and the nonwoven backing material from 2-15 lbs/inch as measured by ASTM D3936.

2. The composite of claim 1, wherein the woven fabric, the non-woven fabric, or the knitted face fabric is a woven fabric having the first surface and the opposing second surface.

3. The composite of claim 1, wherein the woven fabric, the non-woven fabric, or the knitted face fabric is a non-woven fabric having the first surface and the opposing second surface.

4. The composite of claim 1, wherein the woven fabric, the non-woven fabric, or the knitted face fabric is a knitted face fabric having the first surface and the opposing second surface.

5. The composite of claim 1, wherein the first polymer, second polymer, third polymer, and fourth polymer each independently comprises polyester, polypropylene, polyethylene, polyamides, polyurethane, polylactic acid, acetal, co-polyester, co-polyamide, polystyrene, modacrylic, or a combination thereof.

6. The composite of claim 1, wherein the first polymer and the second polymer are present in a multi-component fiber.

7. The composite of claim 1, wherein the third polymer and the fourth polymer are present in a multi-component fiber.

8. The composite of claim 1, wherein the melting point of the first polymer is from about 110° C. to about 250° C.

9. The composite of claim 1, wherein the melting point of the second polymer is from about 130° C. to about 450° C.

10. The composite of claim 1, wherein the melting point of the third polymer is from about 110° C. to about 250° C.

11. The composite of claim 1, wherein the melting point of the fourth polymer is from about 130° C. to about 450° C.

12. The composite of claim 1, wherein the melting point of the second polymer is at least 20° C. higher than the melting point of the first polymer.

13. The composite of claim 1, wherein the melting point of the fourth polymer is at least 20° C. higher than the melting point of the third polymer.

14. The composite of claim 1, wherein the woven fabric, the non-woven fabric, or the knitted face fabric comprises from about 10 wt % to about 40 wt % of the first polymer, and from about 90 wt % to about 60 wt % of the second polymer.

15. The composite of claim 1, wherein the nonwoven backing material comprises from about 20 wt % to about 60 wt % of the third polymer, and from about 80 wt % to about 40 wt % of the fourth polymer.

16. The composite of claim 1, wherein the composite has a three dimensional shape.

* * * * *